Aug. 12, 1952     B. A. DERR     2,606,577
SAW BLADE
Filed Oct. 13, 1949
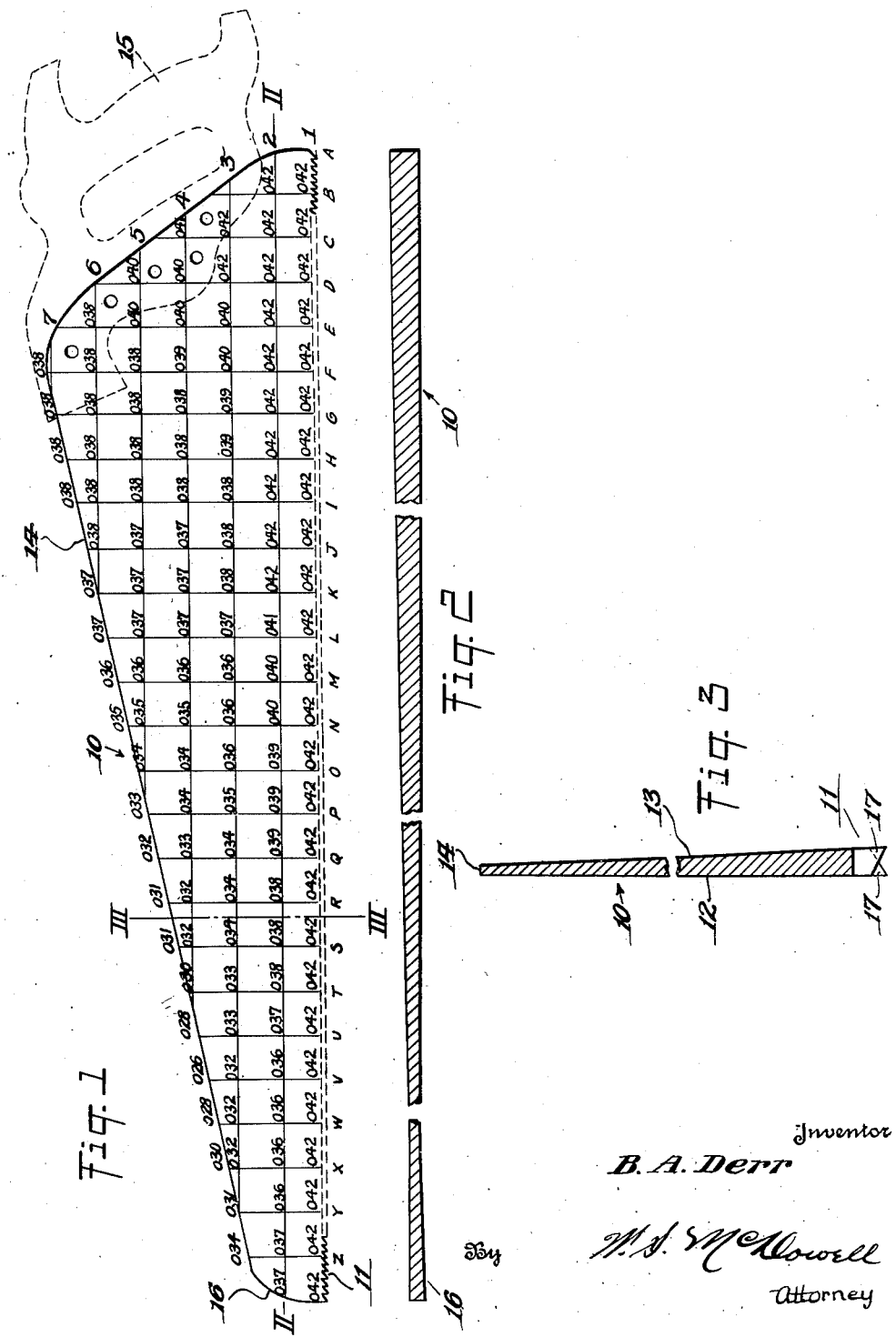
Inventor
B. A. Derr
By W. S. McDowell
Attorney Patented Aug. 12, 1952

2,606,577

UNITED STATES PATENT OFFICE 2,606,577

SAW BLADE

Bernard A. Derr, Columbus, Ohio, assignor to Larsan Manufacturing Company, Columbus, Ohio, a corporation of Ohio Application October 13, 1949, Serial No. 121,122

4 Claims. (Cl. 143—133)

This invention relates to the blade construction of hand saws, having particular reference to saw blades in which the thin metallic bodies thereof vary in their transverse thicknesses in different regions of the blades.

The ordinary blade of a carpenter's saw is formed to possess a substantially uniform cross-sectional thickness throughout all portions thereof. In such a conventional blade, the cutting teeth, provided along the lower edge of the blade require setting, that is alternate teeth are arranged in reversely disposed angular relationship with each other and to the body of the blade. After various periods of use, the teeth of such a blade must be reset to maintain their cutting efficiency.

In accordance with the present invention, a saw blade is provided comprising a relatively thin sheet-like body of steel having side surfaces which taper downwardly and outwardly from the top or back longitudinally extending edge of the blade to the teeth on its lower or cutting edge, whereby to provide a saw blade which is substantially tapered in its vertical transverse configurations, so that the edge of the blade on which the cutting teeth are formed possesses a greater thickness than the top or back edge of the blade, the increased thickness of the material constituting the cutting edge being such as to provide for the formation of cutting teeth thereon which do not require setting as in a conventional saw blade, whereby to enable the teeth to be resharpened at intervals without necessitating resetting of the planes of operation of the teeth.

It is another object of the invention to provide a saw blade which in the longitudinal plane, immediately above the cutting edge thereof, possesses a uniform transverse thickness, but wherein the sides of the blade above its cutting edge are ground so that the blade tapers longitudinally and forwardly from the back or handle end thereof to its forward or nose end, whereby to facilitate movement of the saw blade in the cut or kerf formed thereby in a body of material.

A further object is to provide a saw blade in which the forward or nose end thereof is formed so that its cross-sectional thickness is slightly in excess of adjacent forward portions of the blade so that when the saw is in use, the increased thickness of the extreme forward end of the blade serves as a means for preventing accidental withdrawal of the blade completely from the cut made in material upon which the blade operates.

The nature and scope of my invention will be more fully understood from a consideration of the following description taken in connection with the accompanying drawings, forming a part hereof and in which:

Fig. 1 is a developmental view in front elevation of a saw blade formed in accordance with the present invention;

Fig. 2 is a horizontal longitudinal sectional view taken through the blade on the plane indicated by the line II—II of Fig. 1;

Fig. 3 is a transverse vertical sectional view taken through the blade on the plane disclosed by the line III—III of Fig. 1.

Referring more particularly to the drawing, the numeral 10 designates the steel blade of a carpenter's hand saw when made in accordance with the present invention. In Fig. 1, the front surface of the blade, the back surface being a duplicate thereof, has been developed to disclose the cross-sectional thicknesses of the blade in any given region thereof. In this developmental view, equally spaced vertical constructional lines are designated by the alphabetical letters A to Z, inclusive, and similarly spaced horizontally extending constructional lines have been designated at 1 to 7, inclusive. From a consideration of this view, it will be noted that the toothed edge 11 of the blade, and regions immediately adjacent thereto, possess a greater thickness than the remaining portions of the blade, the front and back sides 12 and 13, respectively, tapering in thickness in transverse vertical planes from the cutting edge 11 to the back longitudinally extending edge 14 of the blade.

I am aware that it has been proposed heretofore to form saw blades having relatively wide toothed edges and sides tapering toward the top or back edge of the blade, as set forth in the patent to Lohman, No. 378,203 of February 21, 1888. However, in the blade forming the present invention, not only is the same tapered in vertical transverse section, but it is similarly tapered in its horizontal longitudinally extending cross section, as is illustrated in Fig. 2 and as shown in mathematical detail in Fig. 1 wherein a representative blade, made in accordance with the present invention, has been depicted. While specific thicknesses, measured in one thousandth of an inch, have been shown in Fig. 1, it is to be understood that these figures are representative or illustrative of but one form of the invention and the same are furnished by way of explanation and not by way of limitation.

In considering Fig. 1, it will be noted that along the toothed edge 11, the blade possesses a uniform thickness throughout its length, but that above said toothed edge, and along the longitudinal planes represented by the numerals 2, 3, 4, 5, 6 and 7, the blade possesses its maximum thickness in the region of its handle 15, the thickness progressively decreasing toward the front and nose end 16 of the blade. This compound taper of the blade, both vertically and longitudinally thereof, provides a blade which operates freely in a saw cut or kerf, and the increased thickness of the lower edge of the blade enables the teeth 17 thereon to be properly formed without being angularly bent or set with respect to the body of the blade.

Another feature is to be found in slightly increasing the transverse thickness, longitudinally considered, of the blade at the front or nose end 16 thereof, in the exaggerated manner illustrated in Fig. 2 or the precise manner disclosed in Fig. 1. This increased thickness at the extreme forward end of the blade, as well as along the extreme rear edge thereof, has been found to be advantageous in that such increased thickness tends to limit the extent of reciprocation of the saw blade in a given cut or kerf. Often in operating a conventional saw blade, the operator increases too greatly the length of the saw stroke, with the result that the blade is pulled out entirely from the kerf and the saw blade injured by the immediate following return stroke. By slightly increasing the thickness of the saw blade, as indicated at its forward end, when the operator tends unconsciously to increase too greatly the length of the stroke, the increased thickness of the nose end causes it to wedge somewhat into tight-fitting engagement with the sides of the kerf, thereby arresting the stroke or notifying the operator through increased pull of the undesired stroke length.

I claim:

1. As a new article of manufacture, a reciprocating saw blade having a longitudinally extending toothed edge, a back edge angular with respect to said toothed edge so that the blade at the forward end thereof is of minimum width and the rear end of said blade being formed for the reception of an operating handle, said blade having at least one of its side surfaces concaved longitudinally so that the extreme forward end of the blade possesses a greater thickness than forwardly disposed intermediate portions of said blade, said blade having its greatest thickness along the rear end thereof to which the operating handle is secured.

2. A saw blade adapted for reciprocation having a toothed edge portion of substantially uniform thickness throughout its length, said blade being transversely tapered and diminishing in thickness in a direction away from said toothed edge portion, said blade having a nose portion at an end thereof, said nose portion being longitudinally tapered with the thickest portion of said taper at the free end edge of the nose portion, and the major portion of said blade being longitudinally tapered with the side surfaces at its thinnest cross-sectional area merging with the side surfaces at the thinnest cross-sectional area of said nose portion.

3. A saw blade adapted for reciprocation having a toothed edge portion, a major portion and a nose end portion; said blade being transversely tapered with the greatest thickness approximately at said edge portion, said blade having its major portion longitudinally decreasing in thickness from the handle end, said blade also longitudinally decreasing in thickness from the nose end to said major portion.

4. A saw blade according to claim 3 wherein the back edge of the blade is inclined and said blade is narrowest at said nose end portion.

BERNARD A. DERR.

REFERENCES CITED

The following references are of record in the file of this patent:

UNITED STATES PATENTS

| Number | Name | Date |
|--------|------|------|
| 134,882 | Hardenbergh | Jan. 14, 1873 |
| 440,253 | Prouty | Nov. 11, 1890 |